May 28, 1968  W. J. HAMPSHIRE  3,385,749

GRADIENT DENSITY REINFORCED STRUCTURAL MATERIAL

Filed June 3, 1965

INVENTOR.
WILLIAM J. HAMPSHIRE
BY
ATTORNEY

United States Patent Office 3,385,749
Patented May 28, 1968

3,385,749
GRADIENT DENSITY REINFORCED
STRUCTURAL MATERIAL
William J. Hampshire, Cuyahoga Falls, Ohio, assignor to Goodyear Aerospace Corporation, Akron, Ohio, a corporation of Delaware
Filed June 3, 1965, Ser. No. 461,097
9 Claims. (Cl. 161—59)

This invention relates to a gradient density reinforced structural material, and more particularly to a lightweight material made primarily of a foamed resin matrix impregnated with glass fibers in a manner to develop the greatest strength of fibers near the surfaces of the matrix by varying the amount of fibers and/or their length from the surfaces to the core of the material thus causing a gradient density across the material as needed for best strength.

Heretofore, it has been well known in plastic and thermosetting resin techniques that the inclusion of a fiberglass fabric impregnated with such resin substantially increases the strength of the structure. Also, some attempts have been made with selective cure systems utilizing pre-mixes or gunk molding with short lengths of glass fibers in the mix being molded to the desired shape. However, none of these prior art techniques have utilized a gradient density of the resin impregnated fiberglass or glass fibers across or through the material as needed for best strength. Such gradient density technique allows a normal or a foamed resin to provide a structural member or other strength member which is very light in weight.

Therefore, it is the general object of the invention to improve over the prior art resin impregnated fabrics or uniform gunk molding techniques by providing a lightweight material made of a foamed resin matrix impregnated with glass fibers crisscrossed to form a substantially material-like consistency therein which fibers are so formed in the matrix in a manner to develop the greatest strength of the fibers near the surfaces.

A further object of the invention is to make a gradient density laminate resin foam material which has great structural strength while being extremely light in weight.

A further object of the invention is to provide a fiber reinforced resin structural material wherein the strength and weight are primarily controlled by the orientation and distribution of the cut fibers, which are sprayed in ribbon-like deposits with forming resin in interwoven diamond shaped patterns so arranged to provide laminate layers of gradient density within the material.

The aforesaid objects of the invention and other objects which will become apparent as the description proceeds are achieved by providing in a lightweight material the combination of a foamed resin matrix, and a plurality of elongate glass fibers intermixed into the resin matrix and defining a fabric-like consistency thereto where the glass fibers are so arranged as to provide laminate layers of gradient density to develop the greatest strength of the fibers near the surfaces of the material.

For a bettter understanding of the invention reference should be had to the accompanying drawings wherein.

Figure 1:
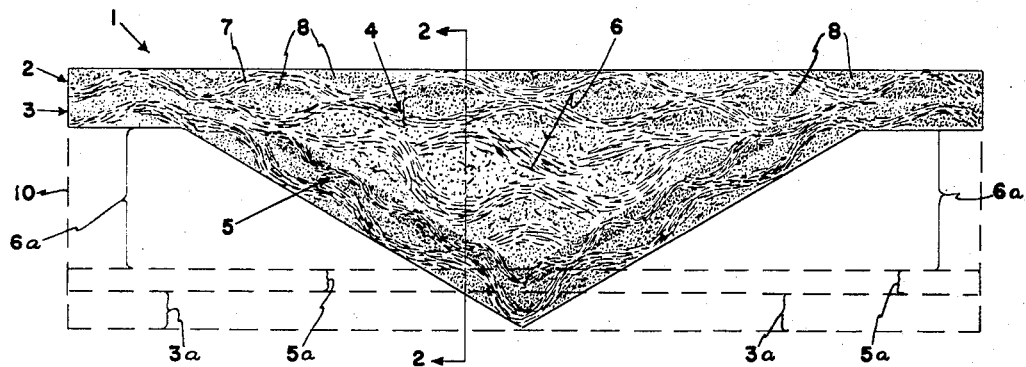
FIGURE 1 is a cross section elevational view of a gradient density fiber reinforced foam material formed to provide one embodiment of the invention.

With reference to the form of the invention illustrated in FIGURE 1, the numeral 1 indicates generally a gradient density reinforced foamed material comprising high density glass fiber reinforced outer layers indicated generally by numerals 2 and 3, slightly lesser density glass fiber reinforced inner layers indicated generally by numerals 4 and 5, and a much lower density foamed resin glass fiber reinforced central layer or core indicated generally by numeral 6. Each layer 2 through 6 is made of a substantially fabric-like consistency wherein the strength and weight are primarily controlled by the orientation and distribution of cut glass fibers interwoven in what might be called warp and weft yarns to define the fabric-like consistency. For example, in layer 2 what could be called a longitudinally extending warp yarn is indicated by numeral 7 and transversely extending weft yarns are indicated by numeral 8. Each of the warp and weft yarns 7 and 8 of layer 2 are made up of a plurality of elongated glass fibers impregnated and surrounded by a suitable resin, for example foamable, thermosetting, or setting when mixed with a suitable catalyst.

Thus, as shown in FIGURE 1, the elongated glass fibers tend to follow and define the shape of the warp yarn 7. Similarly, only the ends of the fibers are visible in the transverse weft yarns 8. Each layer might be sprayed in ribbon-like deposits defining the warp and weft yarns 7 and 8 with a foaming resin, or a normal resin, in interwoven or crisscrossed patterns. Similarly, such spraying can provide the various laminate layers 2 through 6 with the desired gradient density. A suitable apparatus to spray the fabric-like consistency is shown in my co-pending application Serial No. 447,793, which utilized a spray nozzle shown in my U.S. Patent No. 2,929,436. It should be understood that each of the other layers 3 through 6 might be formed in the same manner, and simultaneously one on top of the other, or independently and then placed together before the final curing has taken place so that there might be an intermixing along adjacent surfaces to provide a substantially homogeneous continuous laminate material 1.

The material 1 may initially be formed to the size indicated by the large dotted block, indicated generally by numeral 10, with the layer 3 originally positioned as indicated by dotted block 3a, and the layer 5 originally positioned as indicated by the dotted block 5a. The central foam core 6 as originally formed is indicated by the dotted portion 6a. Thus, since the foamed material 6, originally of size indicated by dotted block 6a is of lesser density gradient than either layers 5 or 3, also indicated in their original size as the dotted blocks 3a and 5a, the material may be made in a substantial rectangular flat panel and then compressed or molded to the shape indicated in FIGURE 1 with such compression being possible because of the variable gradient density between the foam material 6 and the layers 5a and 3a. Naturally, the density gradient of the entire material 1 after the compression molding and curing to such desired shape will be much greater in the end portions where the layers 2 and 3 have been substantially forced together, squeezing the layers 4 and 5 and the ends of the layers 6 together into a greater density at those portions also. The final shape of the material 1 of FIGURE 1 represents a structural material of truss shape and because of the greater strength along the outside surfaces can be used as a truss or a structural beam.

Various ways may be utilized to control the density gradient in each of the layers, or even through each separate layer. For example, the diameter or number of rovings in each glass fiber might be appropriately varied, as well as the length thereof. Specific examples might include miultiple end fibrous glass roving, hard sliane or other suitable finish, elongated fibers. In this instance, the number of rovings might vary between about 3 to about 30 to thereby control the density of glass fibers intermixed with the resin forming the warp and weft yarns of each laminate layer. Similarly, the length of the glass fibers could be varied to between about 1 to about 12 inches to still achieve the fabric-like consistency achieved by the interlacing of the fibers themselves in the warp and weft yarns 7 and 8 as indicated in layer 2 of FIGURE 1, without decreasing the compression qualities in those specific layers, such as layer 6 where the number of glass fibers, and perhaps even the length thereof will be substantially less than in layers 2 and 3.

Figure 2:
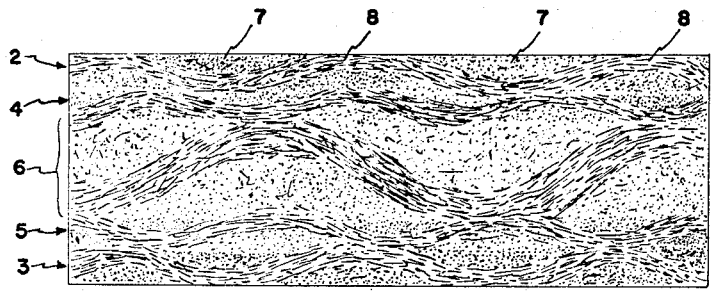
FIGURE 2 is an enlarged cross sectional view of the material of FIGURE 1 taken on line 2—2 thereof.

FIGURE 2 illustrates an enlarged cross sectional view taken on line 2—2 of FIGURE 1, and shows in more detail the relationship between the warp and weft yarns in each of the layers 2 through 6. Note, however that in this view, the ends of the elongate glass fibers are seen in the warp yarn 7 of layer 2 while the elongate fibers are shown in the weft yarns 8. Also, it should be particularly noted that the fibers in layers 2 and 3 are substantially larger and longer than the fibers in layers 4 and 5, as well as in the foamed center layer or core 6. Again, it should be pointed out that even though each of the layers 2 through 6 is formed by laying ribbons or strips of resin having the elongate glass fibers intermixed therewith to provide the fabric-like consistency, that the resin in effect becomes substantially homogeneous throughout each particular layer so the cross sectional view shows each layer cross sectioned across its entire thickness. Also, it should be understood that the gradient density of the layers 4, 5, and 6 will be much greater as they approach the ends of the material 1 because of the compression to that shape. However, the material 1 might be formed to the desired end shape during the spraying or making thereof, rather than compression as described above.

Thus, it is seen that the material 1 becomes a very strong, yet lightweight structural member which has great strength on both outer surfaces and at each end to take load forces in compression, tension, or bending. The particular example shown in FIGURES 1 and 2 utilizes the foam layer or core 6 and the layers 2 through 5 in a manner to develop the greatest strength of the glass fibers near the surfaces of the material 1. Also, any suitable foaming resin or mechanical means of creating a foam base might be used. However, it is not necessary to achieve the objects of the invention that a foam be utilized in combination with the normal resin as either a total resin based material or a total foam based material utilizing the density gradient principles will meet the objects.

Figure 3:
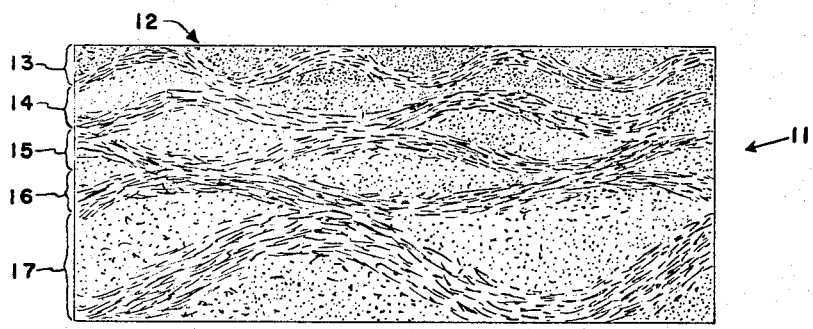
FIGURE 3 is an enlarged cross sectional view of a material having its gradient density reinforcement on only one side thereof.

FIGURE 3 illustrates a material 11 comprising a modified form of the invention where the greatest strength of the glass fibers is provided at a top surface 12. A high density top layer 13 is formed in a crisscrossed laminate with a plurality of increasingly lesser density layers 14, 15, 16 and 17. Such material 11 will also be compressible or moldable because of such density gradient to provide a member having great tension, compression, or bending strength along its top surface 11. Again, it should be understood that each layer 13 through 17 is made with a plurality of elongate glass fibers aligned within a resin strip or ribbon to provide a fabric-like consistency wherein adjacent surfaces are thoroughly intermixed before a final cure is effected. Similarly, layer 17 might again be a resinous foam, while layers 13 through 16 might be normal cure resin, although it should be understood that each layer 13 through 16 could also be resinous foam to appropriately achieve the objects of the invention. In this instance, the variation in density gradient still alows the compressible molding and great strength along the top surface 12.

Thus, it is seen that the objects of the invention have been achieved by providing a lightweight material made of resin impregnated glass fibers of various size and length interconnected with each other to form a fabric-like consistency and interrelated with a foamed layer or in the manner to develop the greatest strength of the fibers along desired surfaces. Although such descriptions have only related to the surfaces being provided with the greater density gradient, it should be understood that the center of a material could also be so provided. The varying of gradient density is accomplished by varying the amount of the fibers, their size, or their length from the surfaces to the core of the material as needed for best strength. The material might be completely made from normal resin, or foaming resin. Foaming of the resin may be accomplished mechanically. The material may be molded or cured continuously in flat panels or may be made to other patterns and provided with single or compound curing techniques.

The variable density throughout the materials may enhance and help control the compression of the materials during a molding process. As a final added feature, decorative or protective films may be used on the surfaces of the material by adhering them to the resin without adhesives, if applied before a final cure.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. In a lightweight laminate the combination of
   a plurality of layers of foamed resin,
   a plurality of elongate relatively straight glass fibers intermixed with the resin and defining a crisscross pattern thereby essentially forming a fabric-like consistency to the resin, and where the amount of fibers and the length thereof is varied across the layers of foamed resin to develop the greatest density and strength of the fibers near the surfaces of the laminate.

2. In a lightweight material the combination of
   a foam resin matrix, and
   a plurality of elongate glass fibers intermixed into the resin and defining a fabric-like consistently thereto where the glass fibers are so arranged as to provide laminate layers of gradient density to develop the greatest density and strength of the fibers near the surfaces of the material.

3. In a lightweight material the combination of
   a foamed resin matrix, and
   a plurality of elongate glass fibers intermixed into the resin and defining a fabric-like consistency thereto where the glass fibers are so arranged to provide laminate layers of gradient density to enhance and control the compressibility of the material during molding.

4. In a lightweight material the combination of
   a plurality of layers of resin,
   a plurality of elongate relatively straight glass fibers intermixed with the layers of resin and defining a crisscross pattern thereby forming a fabric-like con-consistency to each layer of resin, and where the amount of fibers and the length thereof is varied across the layers of resin to develop the greatest density and strength of the fibers near the surfaces of the material.

5. In a lightweight structural material the combination of
   a foam resin core layer,
   a plurality of layers of resin formed around the core layer, and
   a plurality of elongate glass fibers intermixed into the resin in each of the layers and defining a fabric-like consistency thereto where the glass fibers are so arranged as to provide laminate layers of gradient density to develop the greatest strength and density of the fibers near the surfaces of the material.

6. A material according to claim 5 where the numbers and length of glass fibers are varied in each layer to provide the desired gradient density.

7. A material according to claim 5 where the gradient density of the layers are varied in thickness and length so as to control compressible forming of the material to a desired shape.

8. In a lightweight material the combination of
a foamed resin core, and
a plurality of elongate glass fibers intermixed into the resin and defining a fabric-like consistency thereto where the glass fibers are so arranged to provide a gradient density across the material to develop the greatest density and strength of the fibers along desired portions of the material to enhance the use of the material as a structural member.

9. In a structural material the combination of
a foam resin core,
a plurality of laminate resin layers surrounding the core,
a plurality of elongate glass fibers intermixed with the resin layers in a crisscrossed pattern to define a fabric-like consistency to each layer where the number and length of the glass fibers in each layer are selectively varied to develop the greatest density and strength of the fibers in the layers near the surface of the material.

References Cited
UNITED STATES PATENTS

| | | | |
|---|---|---|---|
| 2,642,371 | 6/1963 | Fahrni | 161—165 |
| 3,316,139 | 4/1967 | Alford et al. | 161—93 |

ROBERT F. BURNETT, *Primary Examiner.*

W. J. VAN BALEN, *Assistant Examiner.*